US009614852B2

(12) United States Patent
Kiriyama et al.

(10) Patent No.: US 9,614,852 B2
(45) Date of Patent: Apr. 4, 2017

(54) SENSOR SHARING CONTROL

(71) Applicant: International Business Machines Corporation, Armonk, NY (US)

(72) Inventors: Hayato Kiriyama, Kawasaki (JP); Tomohiro Shioya, Tokyo (JP); Tadashi Tsumura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 14/425,458

(22) PCT Filed: Jul. 19, 2013

(86) PCT No.: PCT/JP2013/069637
§ 371 (c)(1),
(2) Date: Mar. 3, 2015

(87) PCT Pub. No.: WO2014/045699
PCT Pub. Date: Mar. 27, 2014

(65) Prior Publication Data
US 2015/0229643 A1 Aug. 13, 2015

(30) Foreign Application Priority Data
Sep. 21, 2012 (JP) ................................ 2012-208125

(51) Int. Cl.
*H04L 29/06* (2006.01)
*G06F 21/62* (2013.01)

(52) U.S. Cl.
CPC .......... *H04L 63/10* (2013.01); *G06F 21/6218* (2013.01); *H04L 63/20* (2013.01)

(58) Field of Classification Search
CPC ...... H04L 63/10; H04L 63/20; G06F 21/6218
See application file for complete search history.

(56) References Cited

U.S. PATENT DOCUMENTS 7,467,400 B1 * 12/2008 Moss ................. G07C 9/00166
713/150
2002/0026518 A1 2/2002 Ueda et al.
(Continued)

FOREIGN PATENT DOCUMENTS

CN 1877475 A 12/2006
JP 2002016956 1/2002
(Continued)

OTHER PUBLICATIONS

Toninelli et al., Enabling secure service discovery in mobile healthcare enterprise networks, Jun. 2009, IEEE Wireless Communications, vol. 16, Issue No. 3, pp. 24-32.*

(Continued)

*Primary Examiner* — Kenneth Chang
(74) *Attorney, Agent, or Firm* — Jay Wahlquist

(57) ABSTRACT

A mechanism is provided for sensor sharing control dynamically. One or more sensor use permissions are received from one or more sensor provider terminals. For each sensor use permission, a sensor use permission is recorded in an authorization policy thereby forming a set of authorization policies. A use request is recorded for sensor use request information received from a sensor user terminal in a request policy. A search is performed for any authorization policy in the set of authorization policies that matches the request policy. Responsive to identifying the authorization policy that matches the request policy, a list of sensors included in the sensor use permissions of an authorization policy that matches the request policy is created. The list of sensors is transmitted to the sensor user terminal, where the search is performed again dynamically when the request policy or one of the set of authorization policies is changed.

17 Claims, 17 Drawing Sheets

(56) References Cited

U.S. PATENT DOCUMENTS

| | | | |
|---|---|---|---|
| 2002/0097322 A1* | 7/2002 | Monroe | G08B 13/19643 348/159 |
| 2002/0138758 A1* | 9/2002 | Cason | G06Q 10/02 726/1 |
| 2002/0184235 A1* | 12/2002 | Young | G01V 1/00 |
| 2003/0069752 A1* | 4/2003 | LeDain | G06F 19/3418 705/2 |
| 2003/0208490 A1* | 11/2003 | Larrea | G06F 17/3056 |
| 2004/0086088 A1* | 5/2004 | Naidoo | G08B 13/19669 379/37 |
| 2006/0279630 A1* | 12/2006 | Aggarwal | G01S 3/7864 348/143 |
| 2007/0050157 A1* | 3/2007 | Kahn | G01N 33/18 702/55 |
| 2007/0143838 A1* | 6/2007 | Milligan | H04L 63/062 726/15 |
| 2007/0254641 A1* | 11/2007 | Katz | G01C 21/34 455/422.1 |
| 2009/0303329 A1 | 12/2009 | Morisaki | |
| 2011/0074587 A1* | 3/2011 | Hamm | G06Q 10/0833 340/584 |
| 2012/0272290 A1* | 10/2012 | Zaitsev | G06F 21/552 726/1 |
| 2013/0138964 A1* | 5/2013 | Joyce, III | H04L 9/3231 713/176 |
| 2013/0174211 A1* | 7/2013 | Aad | G06F 21/604 726/1 |
| 2013/0208103 A1* | 8/2013 | Sands | G06F 21/31 348/78 |

FOREIGN PATENT DOCUMENTS

| | | |
|---|---|---|
| JP | 2002063694 A | 2/2002 |
| JP | 2004328310 A | 11/2004 |
| JP | 2005227841 A | 8/2005 |
| JP | 2006252436 | 9/2006 |
| JP | 2007-195148 | 8/2007 |
| JP | 2008052601 A | 3/2008 |
| JP | 2009278357 | 11/2009 |
| JP | 2009296433 | 12/2009 |
| JP | 2010217952 A | 9/2010 |
| WO | WO2014/045699 A1 | 3/2014 |

OTHER PUBLICATIONS

Notification Concerning Transmittal of International Preliminary Report on Patentability (PCT/IB/326) dated Apr. 2, 2015, Notification of Transmittal of Translation of the International Preliminary Report on Patentability (PCT/IB/338) dated Apr. 2, 2015, International Preliminary Report on Patentability (PCT/IB/373) dated Mar. 24, 2015, and the translated version of the Written Opinion of the International Searching Authority dated Jan. 10, 2013, International Application No. PCT/JP2013/069637, 9 pages.

* cited by examiner

| | | 112 |
|---|---|---|
| REQUESTOR ID | | ABC12345 |
| USER TERMINAL ID | | PC12345 |
| SENSOR TYPE | | MOVIE (CAMERA) |
| CONTROL LEVEL | | Full |
| SECURITY LEVEL | | Low |
| PERIOD | RESTRICTED | [NO] / YES |
| | DATE | — |
| | TIME | — |
| LOCATION | DESIGNATED | NO / [YES] |
| | RANGE | LATITUDE, LONGITUDE, RADIUS/km |
| | DIRECTION | UNSPECIFIED |
| FUNCTION | STREAM | [YES] / NO |
| | SOUND | [YES] / NO |
| | RESOLUTION | 1024x768 upper |
| | SPEED | 156bps upper |
| | SNAP Shot | NO / [YES] |
| ... | ... | ... |
| USER ATTRIBUTE | ATTRIBUTE NAME | ATTRIBUTE VALUE |

FIG. 2

| | | 114 |
|---|---|---|
| SENSOR PROVIDER ID | | XYZ45678 |
| SENSOR TYPE | | MOVIE (CAMERA) |
| SENSOR SERIAL NUMBER | | MOV123456789 |
| CONTROL LEVEL | | Full |
| SECURITY LEVEL | | High |
| PERIOD | RESTRICTED | NO / [YES] |
| | DATE | 2012.08.01 - 2012.09.30 |
| | TIME | 08:00 - 23:00 |
| INSTALLATION LOCATION | FIXED | NO / [YES] |
| | COORDINATES | LATITUDE, LONGITUDE |
| | DIRECTION | SOUTHWEST |
| FUNCTION | STREAM | [YES] / NO |
| | SOUND | [YES] / NO |
| | RESOLUTION | 1920 x 1200 |
| | SPEED | 10G bps |
| | SNAP Shot | NO / [YES] |
| ... | ... | ... |
| USER RESTRICTIVE ATTRIBUTE | ATTRIBUTE NAME | ATTRIBUTE VALUE |

FIG. 3

SENSOR SHARING CONTROL

BACKGROUND

The present invention relates to a sensor sharing control method and, more particularly, to a sensor control apparatus, method, and computer program for a plurality of sensor providers and a plurality of sensor users.

Recently, security cameras, motion sensors, and the like have been installed everywhere in urban areas. Mobile terminals can also be used as sensors. Vehicle-mounted video cameras have begun to be started as well. It is desired to have a method and apparatus that can flexibly share, control, and use many such sensors.

Japanese Patent Application Publication No. 2004-328310, Japanese Patent Application Publication No. 2008-052601, and Japanese Patent Application Publication No. 2010-217952 disclose specialized real-time information gathering systems in which a sensor provider registers in a management system an authorization policy and sensor that the provider owns, a user registers in the system the conditions of use and the sensor function(s) to which the user wishes to be connected, and the management system compares the states of the endpoints, the use request, and the authorization policy. The systems, however, have not taken into consideration the policy on the sensor user side. Further, no apparatus has been provided that dynamically performs the sensor sharing control when a sensor or a sensor user is moving.

SUMMARY

The present invention has been made in view of the foregoing, and it is an object of the present invention to provide an apparatus, method, and computer program product for performing the sensor sharing control dynamically, flexibly, and in a seamless manner.

In one illustrative embodiment, a method, in a data processing system, is provided for performing sensor sharing control dynamically. The illustrative embodiment receives one or more sensor use permissions from one or more sensor provider terminals. For each sensor use permission, the illustrative embodiment records a sensor use permission in an authorization policy thereby forming a set of authorization policies. The illustrative embodiment receives sensor use request information from a sensor user terminal. The illustrative embodiment records a use request for the sensor use request information in a request policy. Responsive to the request policy being recorded, the illustrative embodiment searches for any authorization policy in the set of authorization policies that matches the request policy. The illustrative embodiment creates a list of sensors included in the sensor use permissions of an authorization policy that matches the request policy. The illustrative embodiment transmits the list of sensors to the sensor user terminal. In the illustrative embodiment, the search is performed again dynamically when the request policy or one of the set of authorization policies is changed.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 2 shows an example of the request policy according to which a sensor user requests the use of a sensor from a management server;

FIG. 3 shows an example of the authorization policy according to which a sensor provider gives permission for the use of a sensor to the management server;

DETAILED DESCRIPTION

Apparatuses for performing the sensor sharing control according to embodiments of the present invention will be specifically described below with reference to the drawings. The following embodiments do not restrict the claimed invention, and all of the combinations of the features described in the embodiments are not necessarily indispensable for the solving means of the invention.

Further, the present invention can be carried out in many different modes, and should not be understood only from the description given for the embodiments.

While the apparatuses comprising computer systems having computer programs introduced therein will be described in the following embodiments, it is apparent to those skilled in the art that part or whole of the present invention can be implemented in dedicated hardware, or as a computer-executable computer program. Therefore, the present invention may take the form of: an embodiment as hardware which is a management server connected so as to be able to communicate data; an embodiment as software; and an embodiment as a combination of software and hardware. The computer program can be recorded on an arbitrary computer-readable recording medium such as a hard disk, a DVD, a CD, an optical storage device, or a magnetic storage device.

First Embodiment

Figure 1:
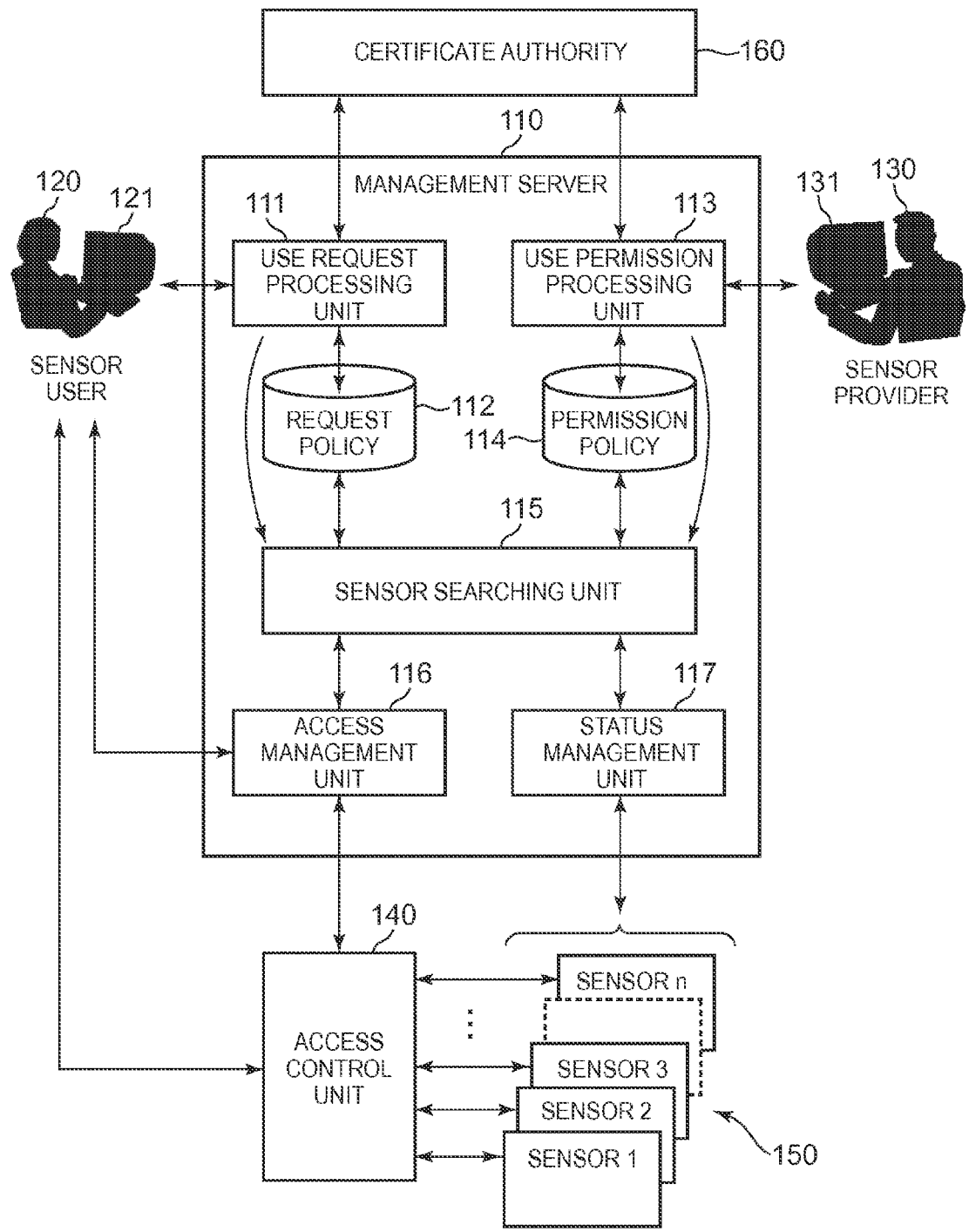
FIG. 1 is a block diagram showing the configuration of a first embodiment of the present invention.

FIG. 1 is a block diagram showing the configuration of a management server 110 according to the first embodiment of the present invention. The general flow is as follows: when a sensor user 120 issues a request for use of sensors to a sensor use request processing unit 111, sensors 150 provided by one or more sensor providers are searched for any sensor matching the request, and the sensor thus found is made operable from a terminal 121 of the sensor user.

The management server 110 includes: the use request processing unit 111 that accepts a request from a user; a request policy DB 112 for recording a request policy; a use permission processing unit 113 that performs registration of a sensor provided by a sensor provider 130 from a terminal 121 of the sensor provider; a authorization policy DB 114 for recording the content of sensor use permission; a sensor searching unit 115 that performs matching between the request policy and the permission policies to search for any sensor available; an access management unit 116 that presents the found sensor(s) to the user; and a status management unit 117 that manages the statuses of the sensors 150.

An access control unit 140, as the term indicates, can finely control various types of accesses from a user terminal 121 to the functions of a sensor. In FIG. 1, the access control unit 140 is provided separately from the sensors. In this configuration, the access control unit 140 performs authentication (verifies user identification) when a sensor is used. Suitably, the access control unit 140 cooperates with the access management unit 116 to avoid re-authentication.

Alternatively, the access control unit 140 may be built in a respective sensor. In this configuration, preferably, the access management unit 116 performs authentication when the sensor is used. The access management unit 116 may issue a token that allows a user to use the sensor to a user terminal 121, and the access control unit 140 may permit the user terminal having the token to access the sensor.

The sensors 150 refer to a plurality of sensors provided by a plurality of sensor providers. The sensors include still image cameras, moving image cameras, sound sensors, motion sensors, infrared sensors, atmosphere sensors, temperature sensors, humidity sensors, wind speed sensors, smoke detectors, and so on. Generally, all devices that convert various kinds of information on the environment into electric signals to transmit them can be used as sensors. While the description will be made of the example where a video camera is used as the sensor in the present invention, other sensors may also be used without departing from the scope of the invention of the present application.

A certificate authority (CA) 160 is an entity that issues a digital certificate, required for example for cryptographic communication, to an e-commerce business operator and so on. When a sensor user 120 or a sensor provider 130 submits a use request or a use permission, the certificate authority 160 performs identification confirmation of the user or provider, verifies the user terminal, or determines whether the sensor itself is reliable. It is noted that the authentication does not necessarily have to be made by a CA; any known authentication technique may be used instead.

When a sensor user 120 or a sensor provider 130 submits a use request or a use permission, an electronic certificate may be used for authentication. The validity of the certificate can be verified in the following manner. First, the certificate authority that has issued the certificate is checked, and next, a superior authority that has authenticated the certificate authority is checked. As the certificate authorities are traced in this manner, when the root certificate authority matching that on the root certificate in hand is finally reached, then it can be determined that the certificate is reliable.

Here, the use request or the use permission may be encrypted by a digital certificate (key). The encryption and decryption technology using a public key and a secret key (private key) is known in the art, and therefore, a detailed description thereof will not be provided here. When the validity of the sensor user 120 or the sensor provider 130, and the user terminal 121 or the sensor 150 is authenticated by the certificate authority (CA) 160, the content of the use request or the use permission is recorded as a request policy or an authorization policy.

FIG. 2 shows an example of the request policy according to which a sensor user requests the use of a sensor from the management server.

In the request policy 112, at least a piece of information indicating an attribute of a user is entered. In many cases, minimum requirements for a sensor that the user wishes to use are entered therein. As used herein, the term "enter" means, not to write on a physical medium such as a sheet of paper, but to record as electronic information on a storage area. More specifically, the request policy 112 includes: a "requestor ID" for identifying a user; a "user terminal ID" for identifying the terminal of the sensor user; a "sensor type" indicating the type of the sensor which the user wishes to use; a "control level" indicating the degree to which the user wishes to control the sensor; a "security level" indicating the degree of secrecy of the sensor; a "period" indicating the period during which the user wishes to use the sensor; a "location" indicating the location of the sensor; a "function" indicating the function(s) of the sensor; and a "user attribute" indicating an additional attribute of the user.

The request policy 112 may be added as appropriate as a set of a user attribute name and its attribute value.

The "requestor ID" for identifying the user may be any piece of information that can specify the user. It may be, for example, a resident identification number. When such a number is not available, the use request processing unit 111 may assign a sequential number to each user.

The "user terminal ID" is information for identifying the terminal of the sensor user. Suitably, further detailed information is added into the subsequent "user attribute" field. For example, the terminal type, the terminal vendor, the working OS, etc. may be input as the user attributes, and attribute values thereof may also be input. This enables meticulous sharing control for a specific device, model, OS, etc.

For the "sensor type" indicating the type of the sensor which the user wishes to use, information indicating the structural type of the sensor which obtains external information, such as a MOVIE (camera), still image (camera), or infrared sensor, is entered.

For the "control level" indicating the degree to which the user wishes to control the sensor, the user may select "Full" when the user wishes to access all functions of the sensor. Otherwise, the user may enter "Low", "Mid", or another particular level.

For the "security level" indicating the degree of secrecy of the sensor, the degree of confidentiality of the sensor is designated. Public-, government-, and police-related sensors have a high security level. In contrast, sensors installed by individuals have a low security level. Sensors installed by companies have an intermediate security level. When the security level of "Low" is designated, almost all sensors will be searched, although whether the user can use each sensor depends on the user attributes. Particularly, in the case of using a sensor of high security level, it is essential to take a measure, such as making mandatory the use of digital certificates for a user, a user terminal, a provider, and a sensor provided, for identity verification and the reliability of data.

For the "period" indicating the period during which the user wishes to use a sensor, when such a period can be specified, "restricted: YES" is selected, and the DATE and TIME are entered. When no period is specified, "restricted: NO" is selected.

For the "location" indicating the location of the sensor, the location where the user wishes to use a sensor is designated. Generally, the user designates a particular place, so that "designated: YES" is selected, and the range within which the user wishes to use sensors is designated. In this example, the latitude, the longitude, and the radius are designated. Alternatively, a rectangular range may be designated by entering (X1, Y1)-(X2, Y2). The "direction" is entered when designating the direction in which a camera is pointed. In the case shown in FIG. 2, "direction" is "unspecified", meaning there is no restriction in terms of direction on the sensor.

For the "function" indicating the function(s) of the sensor, any function the user wishes the sensor to have, and its parameter are designated. When the sensor type is "MOVIE (camera)", it is possible to select the following items: "stream", "sound", "resolution", "transfer rate", and "SNAP Shot (still image)".

When the user wishes to use a sensor of the type that streams live footage, "YES" is selected in the "stream" field. When the user wishes to use a sensor that can also transmit sound information, "YES" is selected in the "sound" field. The "resolution" is designated using the number of horizontal bits and the number of vertical bits. When the user wishes to use a sensor with the resolution of XGA or greater, "1024×768 upper" is entered, as shown in FIG. 2. Similarly, the transfer rate of moving images and the presence/absence of snap shot function for taking still images are designated. Although not shown in the figure, the direction in which the camera is pointed (from side to side and up and down), zoom-in, zoom-out, and other controllable items are also designated.

Besides these, policies about various other functions can be additionally designated depending on the types of sensors. For example, for a radio-frequency sensor, the function of antenna rotation by a motor can be designated.

The "user attribute" indicating the attribute of the user specifies, with an attribute name and an attribute value, to which category the user belongs. The attributes include, for example, information on gender, age, address, occupation, place of work, terminal type, terminal vendor, and working OS. These attributes are referred to when a sensor provider designates user restrictive attribute(s), and only the user who meets the designated condition(s) can use the sensor.

For example, assume that the working OS as the user attribute and its attribute value are specified as "Linux 2.6.1.2". In this case, when a sensor has the user restrictive attribute information designated by the user provider as "Linux 3.0.0.0 upper", the user is not allowed to use this sensor. When there is a change in content of the request policy 112, the use request processing unit 111 informs the sensor searching unit 115 that the content of the request policy 112 has been changed. The sensor searching unit 115 performs the search again on the basis of the information.

FIG. 3 shows an example of an authorization policy according to which a sensor provider gives permission for the use of a sensor to the management server.

In the authorization policy 114, at least a piece of information indicating an attribute on a sensor provider side is entered. In many cases, use permission requirements for a sensor the use of which the provider wishes to permit are entered therein. The authorization policy 114 includes: a "sensor provider ID" for identifying a provider; a "sensor type" indicating the type of the sensor the use of which the provider wishes to permit; a "sensor serial number" which is the manufacturer's number of the sensor; a "control level" indicating the degree to which the sensor is to be controlled; a "security level" indicating the degree of secrecy of the sensor; a "period" indicating the period during which the use of the sensor is to be allowed; an "installation location" indicating the location of the sensor; a "function" indicating the function(s) of the sensor; and a "user restrictive attribute" indicating the attribute for restricting users.

The authorization policy 114 may be added as appropriate as a set of an attribute name and its attribute value of a provider or a sensor provided by the provider.

The "sensor provider ID" for identifying a provider may be any piece of information that can specify the provider. It may be, for example, a resident identification number. When such a number is not available, the use permission processing unit 113 may assign a sequential number to each provider.

For the "sensor type" indicating the type of the sensor which the provider wishes to provide, information indicating the structural type of the sensor which obtains external information, such as a MOVIE (camera), still image (camera), or infrared sensor, is entered.

For the "control level" indicating the degree to which the sensor is to be controlled, the provider may select "Full" when the provider allows a user to access all functions of the sensor. Otherwise, the provider may enter "Low", "Mid", or another particular level.

For the "security level" indicating the degree of secrecy of the sensor, the degree of confidentiality of the sensor is designated. Public-, government-, and police-related sensors have a high security level. In contrast, sensors installed by individuals have a low security level. Sensors installed by companies have an intermediate security level. When the security level of "High" is designated, users are restricted. Generally, the conditions are listed in the subsequent "user restrictive attribute" field. Particularly, in the case of permitting the use of a sensor of high security level, it is essential to take a measure, such as making mandatory the use of digital certificates for a user, a user terminal, a provider, and a sensor provided, for identity verification and the reliability of data.

For the "period" indicating the period during which the provider allows a user to use the sensor, when such a period can be specified, "restricted: YES" is selected, and the DATE and TIME: are entered. When no period is specified, "restricted: NO" is selected.

The "installation location" indicating the installation location of the sensor designates the location where the sensor provided by the provider is installed. The entry "fixed: YES" means that the location of the sensor is fixed. The entry "fixed: NO" means that the sensor is movable like a vehicle-mounted camera. In the case of "fixed: YES", the latitude and the longitude are entered as the coordinates below. When the camera is pointed in a fixed direction, the direction is entered. In the case of "fixed: NO", the status management unit 117 updates the coordinates at regular intervals on the basis of the positional information from a sensor such as a GPS. The period of the regular interval varies depending on the types of sensors. For a sensor that hardly moves, the regular interval may be every several hours to every several days. For a sensor that moves very fast, the regular interval can be every several milliseconds.

For the "function" indicating the function(s) of the sensor, the function(s) of the sensor and parameter(s) thereof are designated. When the sensor type is "MOVIE (camera)", it is possible to select the following items: "stream", "sound", "resolution", "transfer rate", and "SNAP Shot (still image)".

When the sensor is of the type that streams live footage, "YES" is selected in the "stream" field. When the sensor can also transmit sound information, "YES" is selected in the "sound" field. The "resolution" of the sensor is designated using the number of horizontal bits and the number of vertical bits. In the case of FIG. 3, "1920×1200" has been entered. Similarly, the transfer rate of moving images and the presence/absence of snap shot function for taking still images are designated.

For the "user restrictive attribute" for restricting users, minimum attribute requirements the provider requires a user to meet in order to use the sensor are designated. The attribute requirements are designated using attribute names and attribute values. They include, for example, information on gender, age, address, occupation, place of work, terminal type, terminal vendor, and working OS. Only the user who meets the requirements can use the sensor. When there is a change in content of the authorization policy 114, the use permission processing unit 113 informs the sensor searching unit 115 that the content of the authorization policy 114 has been changed. The sensor searching unit 115 performs the search again on the basis of the information.

Figure 9:
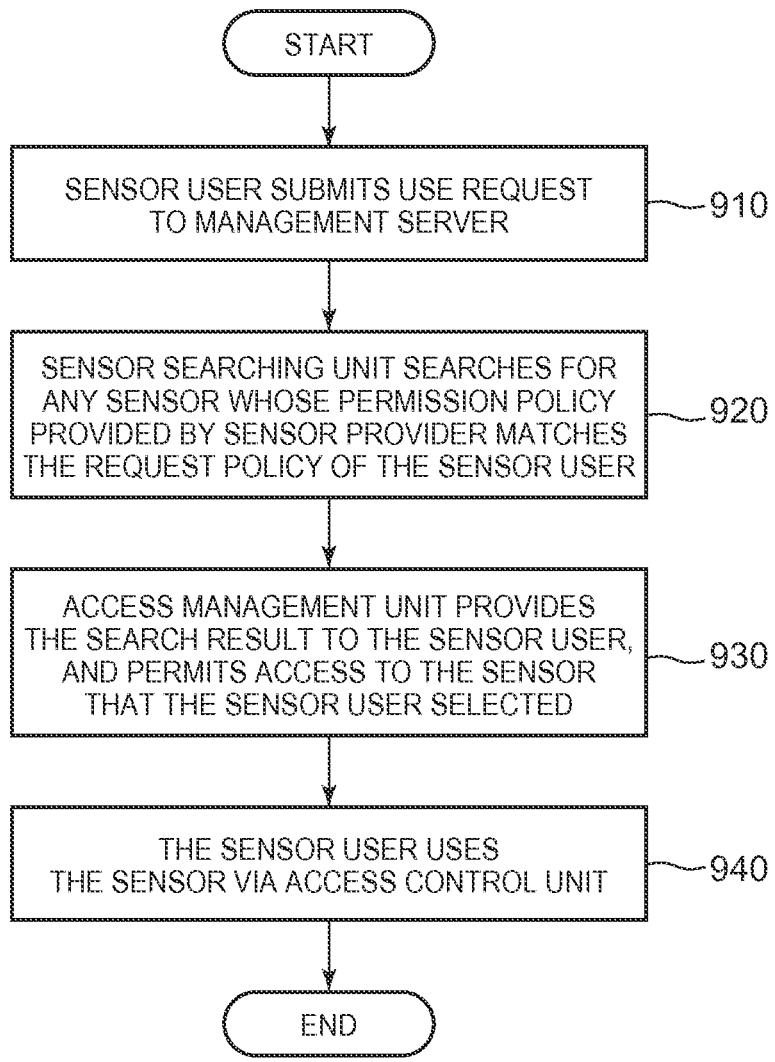
FIG. 9 is a flowchart for sensor sharing control.

FIG. 9 is a flowchart for dynamic sensor sharing control according to the first embodiment. In step 910, a sensor user 120 submits a sensor use request to the management server 110. The use request processing unit 111 records the use request in the request policy 112.

Next, in step 920, the sensor searching unit 115 reads permission policies of the sensors provided by the sensor provider(s) 130, and searches for any sensor the authorization policy of which matches the request policy of the sensor user 120 (policy matching). A list of the sensors that have been found is transmitted to the access management unit 116. In step 930, the access management unit 116 receives the list of the sensors from the sensor searching unit 115, transmits the list to the sensor user terminal 121, receives the information about the sensor that has been selected by and can be controlled by the sensor user 120, and finally, transmits the information for specifying the sensor user who can operate the sensor (the user ID, the user terminal ID, the certificate including them, a temporarily issued token, etc.) to the access control unit 140.

The access management unit 116 basically performs the processing of passing access control information to the access control unit 140. In a more simplified embodiment, an ACL describing which terminal can perform what access to which sensor may be issued. Preferably, the access management unit 116 transmits tokens to the sensor user terminal 121 and the sensor. Each access control unit gives permission to access the corresponding sensor to only the user terminal that has received the token permitting the control of the sensor.

The token may be configured to include a set of the sensor serial number and the ID of the user terminal which can use the sensor. Alternatively, a hash function may be used. That is, a hash value may be calculated from the sensor serial number and the ID of the user terminal which can use the sensor, and the resulting hash value may be used as a token. In this case, the token is also transmitted to the access control unit 140 of the sensor. Making only the user terminal having the token allowed to control the sensor can prevent illegal access control.

Lastly, in step 940, the sensor user 120 controls the sensor that has become accessible from the sensor user terminal 121 via the access control unit 140.

Figure 10:
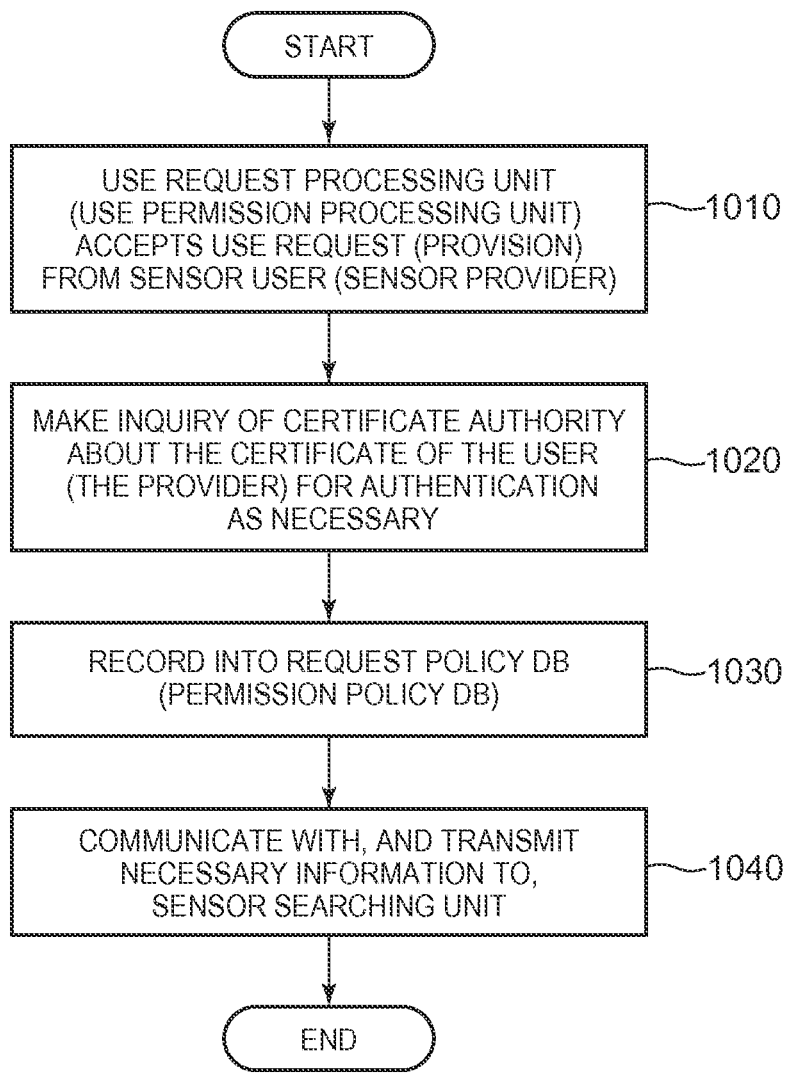
FIG. 10 is a flowchart for user authentication and policy recording.

FIG. 10 is a flowchart for user authentication and policy recording. In FIG. 10, the flows for a user and a provider are identical to each other. The flow will be described from the viewpoint of a requestor side, while the case of the provider side will be described in parentheses.

In step 1010, the use request processing unit 111 (the use permission processing unit 113) accepts the use request of a sensor (the provision of a sensor) from a sensor user 120 (a sensor provider 130).

Next, in step 1020, when a certificate is attached to the content of the request (the content of the provision), or when the content of the request (the content of the provision) includes information having a high degree of secrecy or designation of attribute requirement(s), inquiry is made of the certificate authority about the validity of the sensor user 120 (the sensor provider 130) and the validity of the sensor user terminal 121 (the sensor 150 provided by the sensor provider), for authentication of the user (the provider). If the authentication fails, the content of the request (the content of the provision) is not recorded as a policy, and the subsequent processing is not performed.

Next, in step 1030, the content of the request (the content of the provision) is recorded in the request policy 112 (the authorization policy 114).

Lastly, in step 1040, the use request processing unit 111 (the use permission processing unit 113) informs the sensor searching unit 115 that the record of policies has been updated, and transmits necessary information including the updated part to the sensor searching unit 115.

Figure 12:
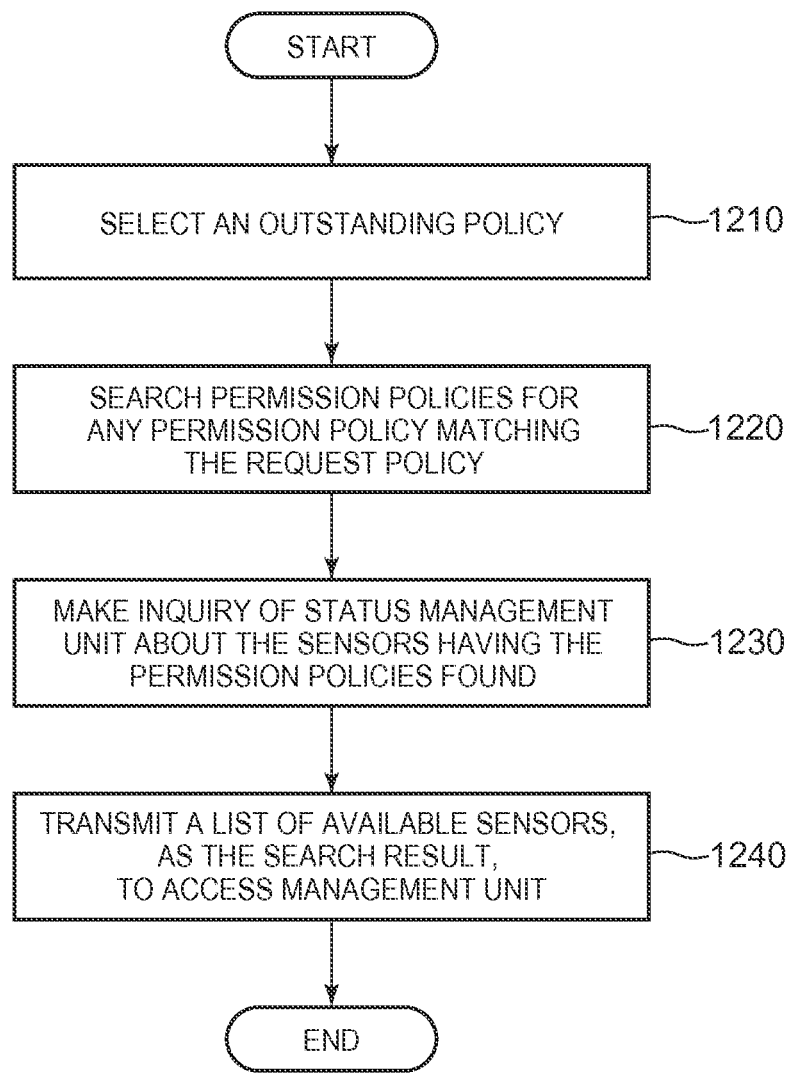
FIG. 12 is a flowchart illustrating the processing performed by a sensor searching unit.

FIG. 12 is a flowchart illustrating the processing performed by the sensor searching unit. Generally, the sensor searching unit 115 performs searching of sensors when it receives information about the update of a policy from the use request processing unit 111 or the use permission processing unit 113.

In step 1210, an outstanding policy is selected. The outstanding policy may be the request policy to which addition or modification has been made, or the request policy that has been affected by the addition or modification made to the authorization policy. That is, the request policy for which searching needs to be newly done is selected.

Next, in step 1220, the permission policies 114 are searched for any authorization policy that matches the selected request policy.

Next, in step 1230, inquiry is made of the status management unit 117 about the statuses of the sensors having the permission policies found by the searching. The status management unit 117 returns the information on availabilities of the designated sensors, to the sensor searching unit 115. Preferably, the status management unit 117 is configured to poll the sensors (which vary depending on the sensor type), at regular intervals, and transmit the statuses of the sensors to the sensor searching unit 115. This configuration works well as a trigger for the sensor searching unit 115 to dynamically perform searching again. Preferably, the status management unit 117 also obtains GPS positional information of the sensors at the time of polling.

Lastly, in step 1240, the sensor searching unit 115 transmits a list of the available sensors, as the search result, to the access management unit 116. The process then returns to step 1210, where the sensor searching unit 115 selects a next outstanding policy.

As described above, when there is a change in status of a sensor, position of a sensor, the content of a request policy, or the content of an authorization policy, the search (policy matching) is performed again by the sensor searching unit 115. This enables the dynamic sensor sharing control.

Figure 11:
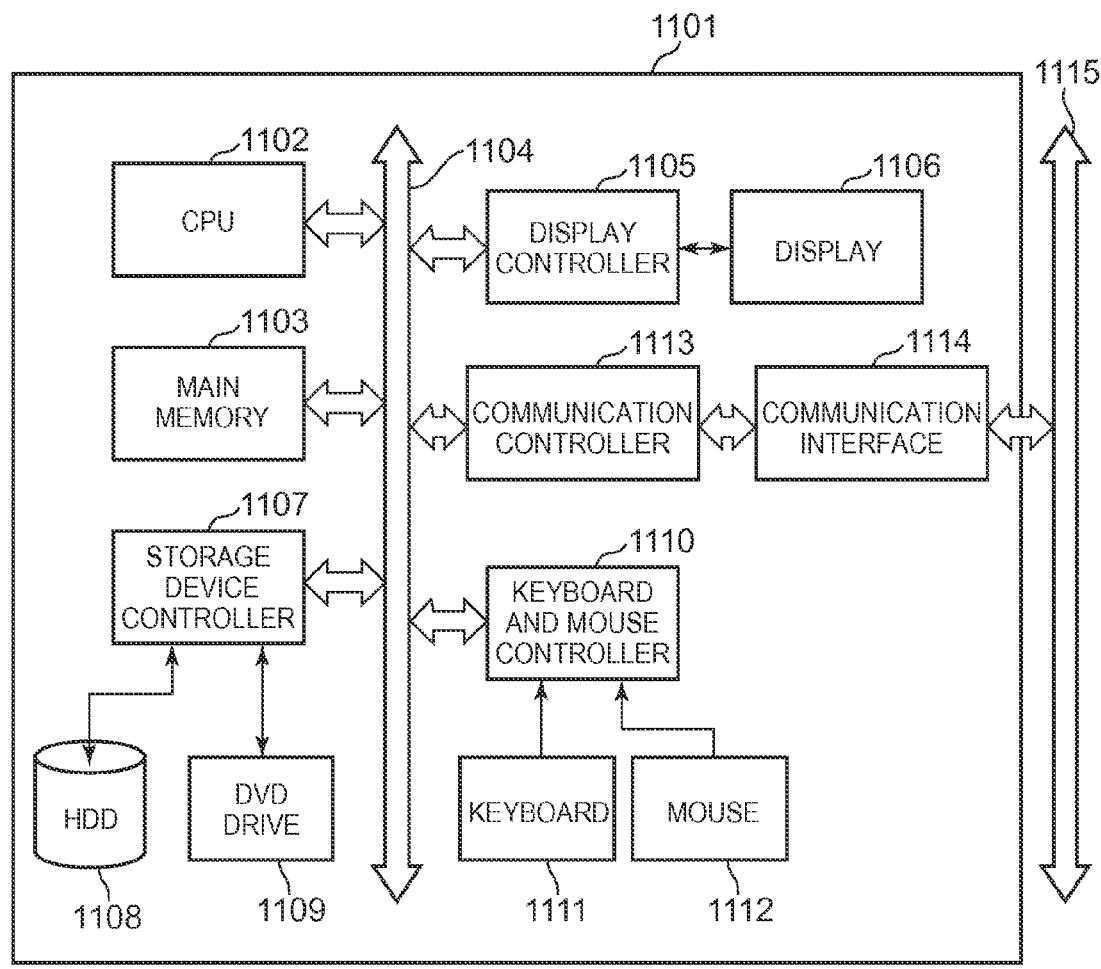
FIG. 11 shows an example of the computer hardware used in the present invention.

FIG. 11 is a block diagram showing an example of the computer hardware used in the terminal 121 of the sensor user 120, the terminal 131 of the sensor provider 130, and the management server 110 according to the present invention. The computer (1101) includes a CPU (1102) and a main memory (1103), which are each connected to a bus (1104). The CPU (1102) may be a CPU based on the zSeries (registered trademark), PowerPC (registered trademark), or another 32-bit or 64-bit architecture, for example a processor of any of Intel Corporation's Xeon (registered trademark) series, Core (registered trademark) series, Atom (registered trademark) series, Pentium (registered trademark) series, and Celeron (registered trademark) series, or AMD's Phenom (registered trademark) series, Athlon (registered trademark) series, Turion (registered trademark) series, and Sempron (registered trademark) series.

A display (1106), which is a display device such as an LCD monitor, is connected to the bus (1104) via a display controller (1105). The display (1106) is used for displaying an application, a sensor request screen, a sensor providing screen, and a GUI 330, A hard disk (1108) or a silicon disk, and a CD-ROM drive, a DVD drive, or a Blu-ray drive (1109) are also connected to the bus (1104) via a storage device controller (1107).

The management server 110 has a storage device in which a program for performing the processing of the use request processing unit 111, the use permission processing unit 113, the sensor searching unit 115, the access management unit 116, and the status management unit 117 is stored. The request policy 112 and the authorization policy 114 are also stored in the storage device. In the user environment in the terminal of the sensor user 120 or the terminal of the sensor provider 130, a program for displaying the OS, an application, and the GUI 330 is also stored. The programs and data are preferably loaded from the hard disk (1108) to the main memory (1103) and executed by the CPU (1102).

The CD-ROM, DVD, or Blu-ray drive (1109) is used, as required, to install the programs of the present invention from a computer-readable medium (CD-ROM, DVD-ROM, or Blu-ray disk) to the hard disk, or to read data from the computer-readable medium. Furthermore, a keyboard (1111) and a mouse (1112) are connected to the bus (1104) via a keyboard and mouse controller (1110). Additionally, communications to and from an external device from and to computer (1101) may be facilitated via external bus (1115), which is connected to bus (1104) via a communication controller (1113) and communication interface (1114).

According to the first embodiment described above, the sharing control of a plurality of sensors can be carried out smoothly in real time among a plurality of sensor providers and a plurality of sensor users.

Second Embodiment

Figure 16:
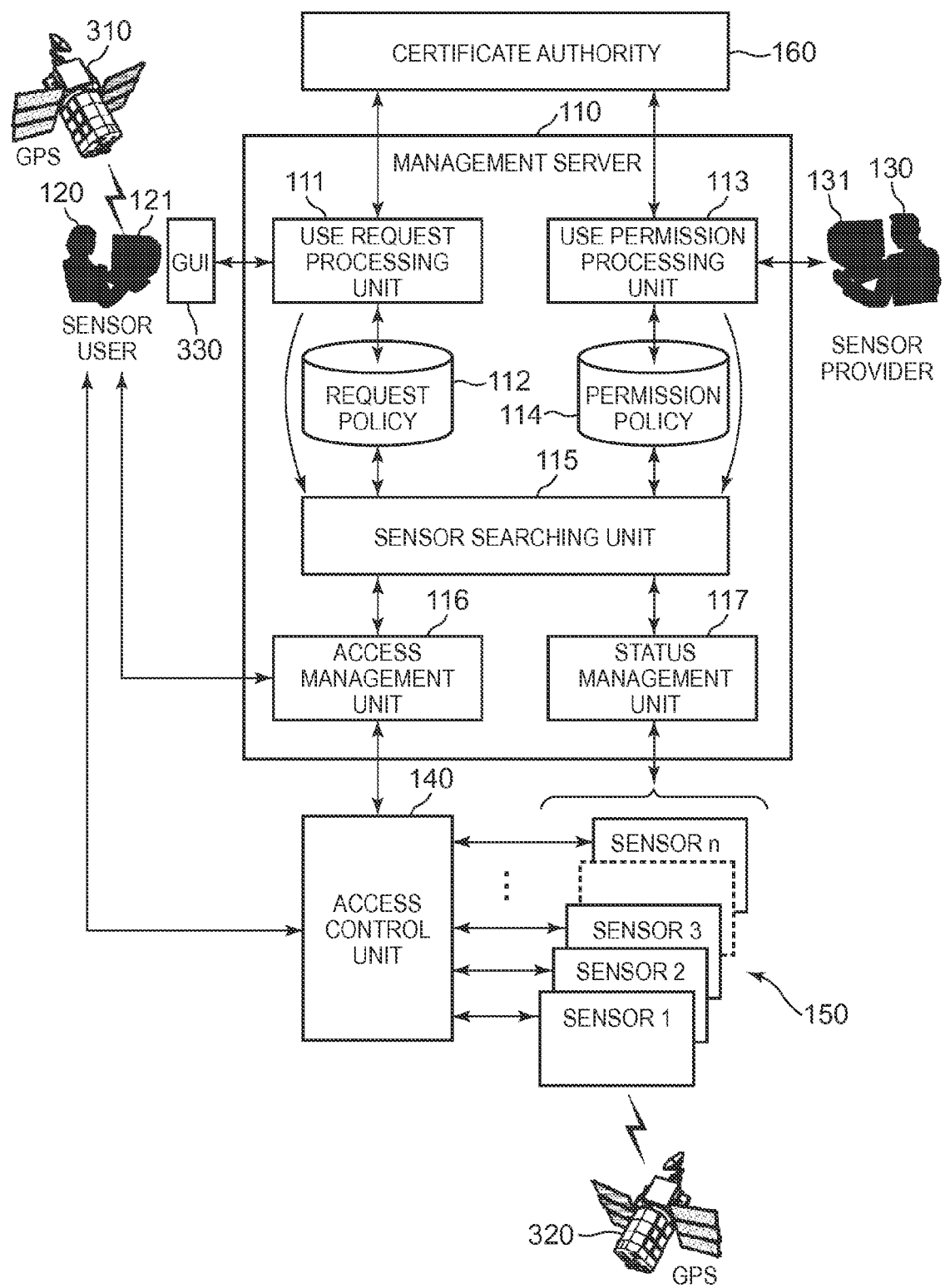
FIG. 16 is a block diagram showing the configuration of a second embodiment of the present invention.

FIG. 16 is a block diagram showing the configuration of a second embodiment of the present invention. The configuration of the second embodiment is identical to that of the first embodiment illustrated in FIG. 1 except that a GUI 330 is added to the sensor user terminal 121 and that a GPS 310 and a GPS 320 are used for measuring a position in real time. The GPS 310 and The GPS 320 enable the real-time sensor sharing control when one or both of the sensor user terminal 121 and the sensors 150 are moving.

In the request policy 112, a user attribute (the user terminal) and its attribute value (the coordinates of the terminal) are entered additionally. The positional information of the user terminal 121 is transmitted at regular intervals on the basis of the information from the GPS and the like. The use request processing unit 111 receives the positional information and updates the coordinates of the terminal in the request policy 112. Further, the status management unit 117 updates the coordinates of a sensor at regular intervals on the basis of the positional information of the sensor from the GPS and the like. The sensor searching unit 115 refers to these pieces of coordinate information, as required, at the time of policy matching. For a user terminal that hardly moves, the regular interval may be every several hours to every several days. For a user terminal that moves very fast, the regular interval can be every several seconds.

Referring now to FIGS. 4 to 8, the GUI 330 will be described. The GUI 330 plays a significantly important role in the sensor sharing control with high usability, for performing the sharing control of the sensors 150 as efficiently as possible and for grasping pieces of information from a plurality of sensors simultaneously in real time.

Figure 4:
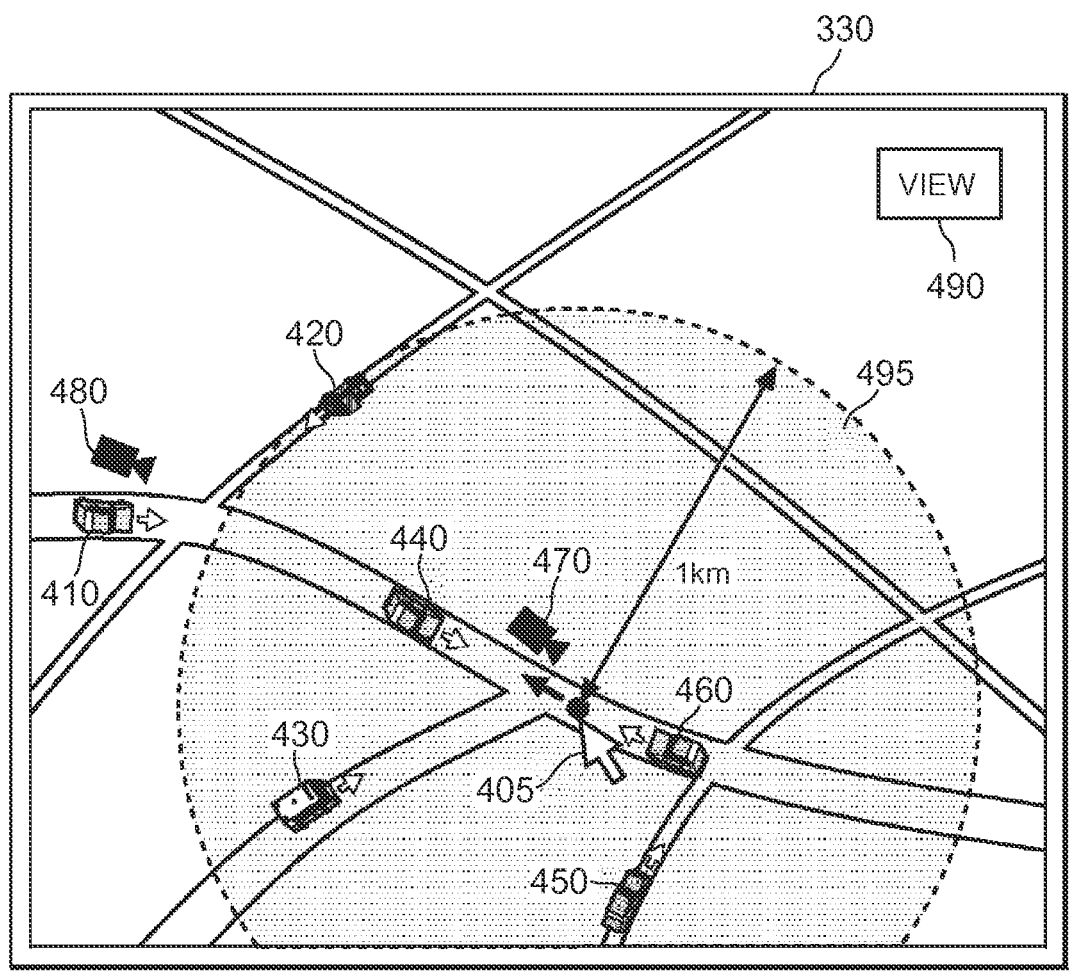
FIG. 4 shows an example of the screen displayed in the MAP mode.

FIG. 4 shows a screen (an initial screen) displayed in a MAP mode of the GUI 330. The GUI 330 provides an efficient UI for providing a user with information of the sensors for which the sharing control has become possible, such as vehicle-mounted cameras 410, 420, 430, 440, 450, and 460, and a fixed cameras 470 and 480. In the MAP mode, the sensors that have become available to the sensor user terminal 121 are displayed on a map on the basis of the GPS positional information.

In the example shown in FIG. 4, it is assumed that the sensor user terminal 121 is stationary at a fixed position (within an information management center or the like). For example, the sensor user terminal 121 is located at the center of the map being displayed. The sensor user terminal 121, however, may be located in a moving vehicle. In such a case, it may be configured such that the position of the terminal is displayed always at the center of the screen on the basis of the positional information received from the GPS.

First, a sensor user 120 designates an area within which the user wishes to receive information from sensors. Here, the sensor user 120 selects (clicks) a specific point on the screen with a pointer 405. The specific point corresponds to an object that the sensor user 120 wants to check, such as a vehicle violating a law, a vehicle damaged by an accident, a crime scene, an event site, a scene of a disaster, etc. The positional information of the location may be automatically obtained from specific sensor information. In FIG. 4, the point where a fleeing criminal's vehicle is supposed to be located has been selected.

Next, the sensor user 120 inputs a radius by inputting numerical values with the keyboard or by using the GUI (for example by dragging the mouse while holding down the right mouse button). In FIG. 4, a 1-km radius is designated. While a circular area is designated in the example shown in FIG. 4, a rectangular area may be designated instead. There are many other ways of designating an area. When the radius is determined, a sensor selecting area 495 is displayed as a circle.

When the area designation is finished, sensors located within the area are identified. In the case of FIG. 4, vehicle-mounted cameras 420, 430, 440, 450, and 460, and a fixed camera 470 are identified within the area. It is noted that when a single sensor is selected in the MAP mode, the mode is switched to a solo mode (which will be described later) for viewing information on that sensor alone.

Figure 5:
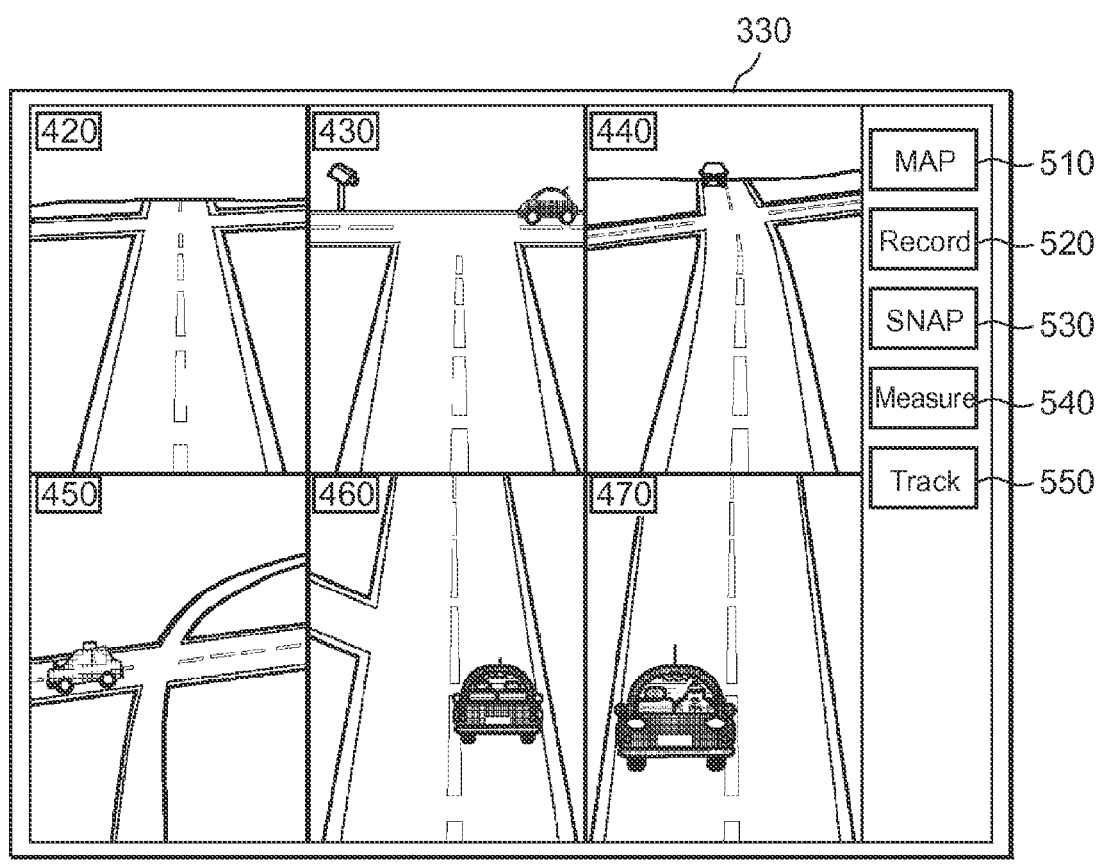
FIG. 5 shows an example of the screen displayed in the VIEW mode.

Next, when a VIEW button 490 is selected, the GUI 330 is switched to a VIEW mode. FIG. 5 shows an example of the screen displayed in the VIEW mode of the GUI 330.

In the VIEW mode, the display screen is divided into a plurality of sections, and the sensors located within the designated area are displayed in the respective sections on the screen. In FIG. 5, the vehicle-mounted cameras 420, 430, 440, 450, and 460, and the fixed camera 470 are identified within the area. In this case, there are six sensors, so that the screen is divided into six sections. If there are three sensors, the screen is of course divided into three sections. The split-screen display method is known in the art and, thus, is not described further. The VIEW mode is, in other words, a multiple-sensor simultaneous viewing mode.

In the VIEW mode, function buttons (a MAP button 510, a Record button 520, a SNAP button 530, a Measure button 540, and a Track button 550) are displayed on the right on the screen. The MAP button 510 is a button for switching to the MAP mode in FIG. 4. The Record button 520 is a button for recording a moving image. The SNAP button 530 is a button for recording a still image. The Measure button 540 is a button for performing measurement. The Track button 550 is a button for tracking a target selected.

Figure 6:
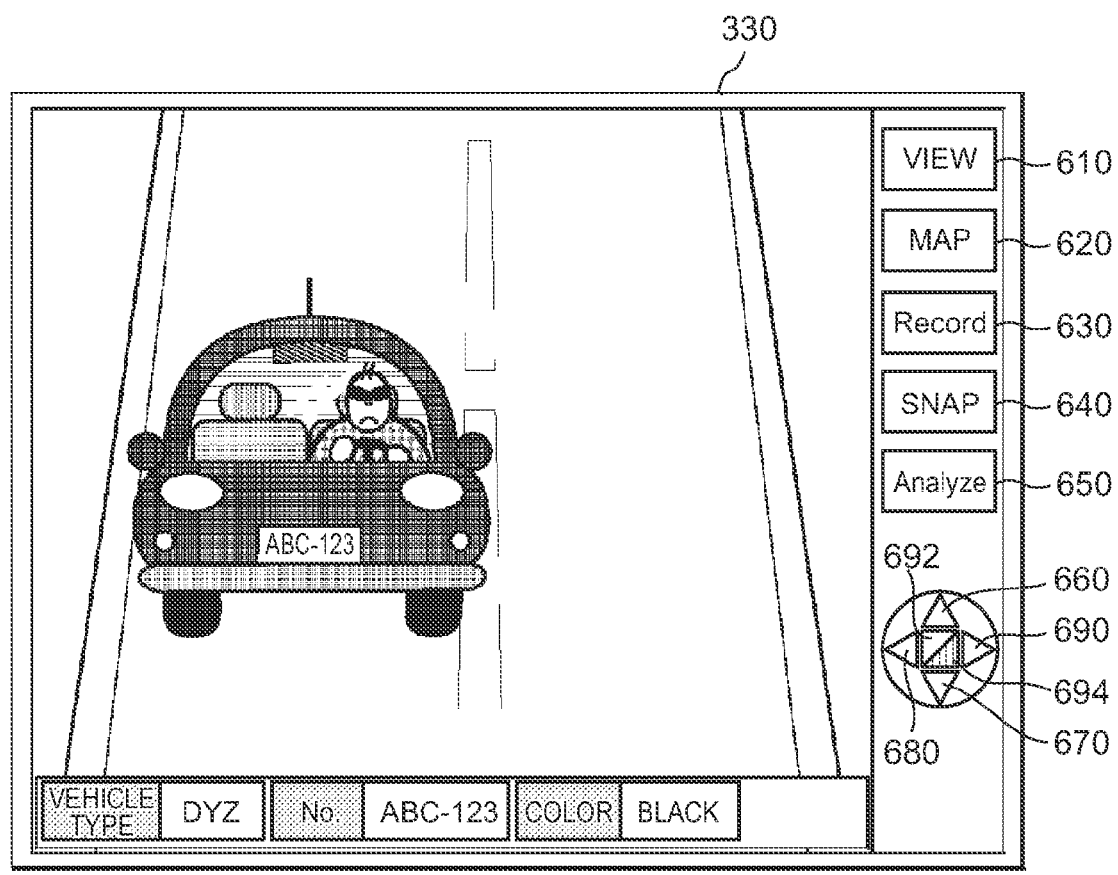
FIG. 6 shows an example of the screen displayed in the solo mode.

In the VIEW mode shown in FIG. 5, when the user wishes to watch the moving image taken by the fixed camera 470 more closely, the user selects the window 470 with the pointer or mouse. This makes the screen switched to the solo mode. FIG. 6 shows an example of the screen displayed in the solo mode. The solo mode is a mode for displaying information of a single sensor in full screen.

In the solo mode shown in FIG. 6, the information of a single sensor is displayed in full screen, and function buttons (a VIEW button 610, a MAP button 620, a Record button 630, a SNAP button 640, and an Analyze button 650) and control buttons are displayed on the right on the screen. The MAP button 620 is a button for switching to the MAP mode in FIG. 4. The VIEW button 610 is a button for switching to the VIEW mode in FIG. 5. The Record button 630 is a button for recording a moving image. The SNAP button 640 is a button for recording a still image. The Analyze button 650 is a button for analyzing the part selected.

The control buttons 660, 670, 680, 690, 692, and 694 are displayed in the case where the sensor is of a type the direction of which is controllable. In the case where the camera can be controlled to point in the directions of up, down, left, and right, the corresponding buttons 660, 670, 680, and 690 can be clicked to adjust the direction. The control buttons 692 and 694 are displayed in the case where the sensor has a zoom-in function and a zoom-out function.

In FIG. 6, the user may press the SNAP button 640 to record and display a still image. When the user selects the area corresponding to a fleeing vehicle with a pointer or the like and presses the Analyze button 650, an image analysis is performed. The result of the image analysis is then displayed at the bottom on the screen. There are various ways of analyzing an image in a selected area, which methods are known in the art and, thus, a detailed description thereof will not be provided here. In the example shown in FIG. 6, a vehicle type, a license plate number, and a color of the vehicle are displayed as the results of shape analysis, character recognition, and color analysis, respectively.

Figure 7:
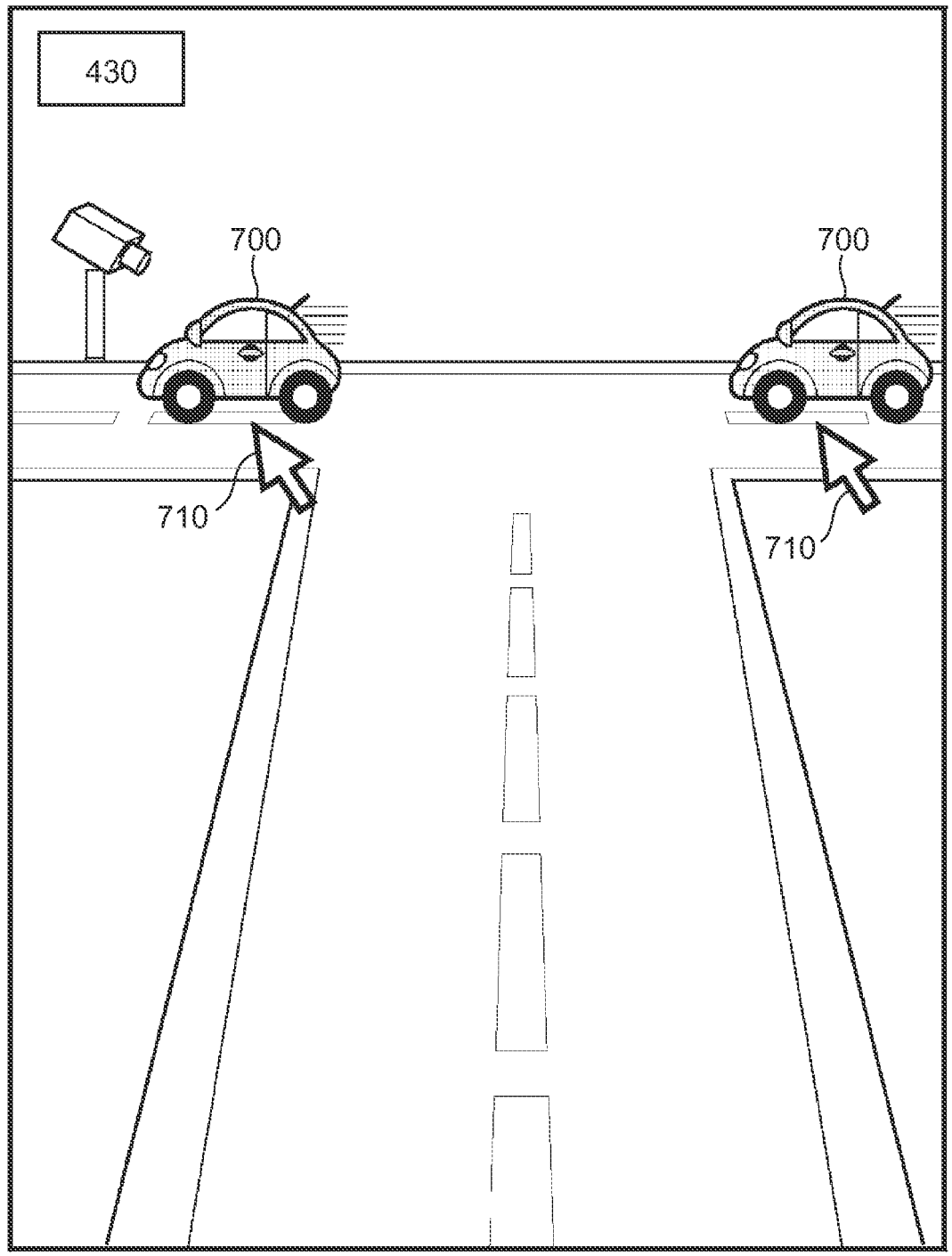
FIG. 7 shows, by way of example, how the speed is measured.

The Measure button 540 in the VIEW mode shown in FIG. 5 is a button for measuring a physical parameter of the object (in the example shown in FIG. 5, the speed of the fleeing vehicle). FIG. 7 shows an example of measuring the speed. A cursor or the like is used to focus on the window 430. In the window 430, assuming that a fleeing vehicle is moving from right to left, when the user clicks the rightmost vehicle position and then clicks the leftmost vehicle position with the pointer 710, the speed of the fleeing vehicle can be calculated from the time between the clicks, the travel distance, and the traveling direction.

The Measure button may function in another way. When the fixed camera 470 is a speed measuring sensor, only pressing the Measure button in the window 470 allows the speed of the fleeing vehicle to be measured.

Further, in the VIEW mode, a lock-on function is provided when an object is selected in a particular window. When an object 700 within the window shown in FIG. 7 is selected with a pointer or the like, it is subjected to image analysis, whereby the shape of the object is determined. When an object determined to be identical in shape to the object 700 is found in another sensor window, the found object is automatically selected. In this manner, the two-dimensional position of the object is calculated.

Pressing the Track button makes it possible to track the movement of a selected object. For example, when a cursor key or the like is used to focus on the window 470 and the Track button 550 is pressed, the tracking of the fleeing vehicle is conducted. That is, the position selected with the pointer 405 in FIG. 4 is replaced with the fleeing vehicle. The current position of the fleeing vehicle is obtained by the lock-on function, or automatically calculated from the speed and moving direction of the fleeing vehicle, and the sensor selecting area 495 is also automatically changed in position.

When the Track button is pressed in the state where an object has been locked on, the tracking of the object is conducted. The two-dimensional position of the object is calculated from the information obtained from a plurality of sensors. The position that was selected with the pointer 405 in FIG. 4 is replaced with the position of the object, so that the object can be automatically tracked in the MAP mode. In addition, the range of the sensor selecting area 495 dynamically moves along with the movement of the object.

Figure 8:
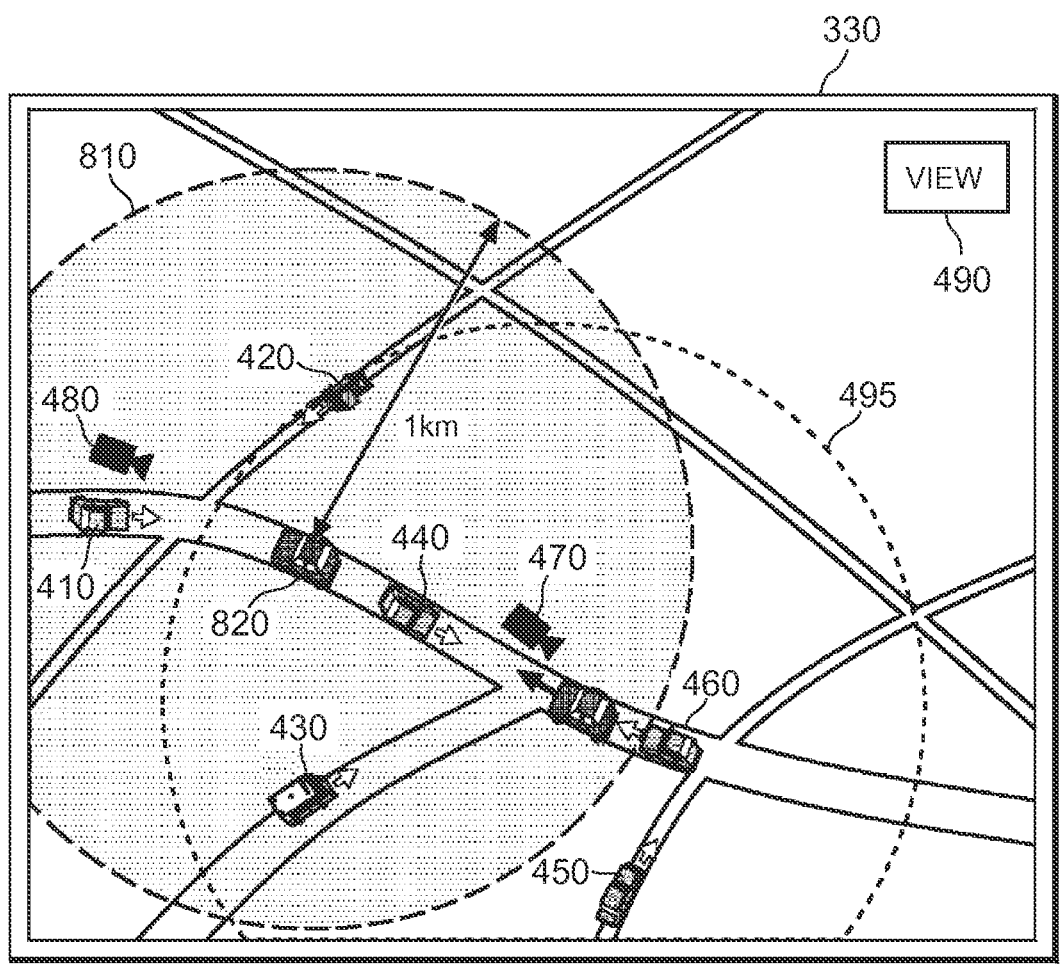
FIG. 8 shows an example of the screen displaying moving vehicles.

FIG. 8 shows, by way of example, the screen on which the fleeing vehicle is moving to a point 820. With the movement of the fleeing vehicle, the sensor selecting area 495 is changed to a sensor selecting area 810. Along with this, the sensors in the area are also changed to vehicle-mounted cameras 410, 420, 430, and 440, and fixed cameras 470 and 480.

Figure 13:
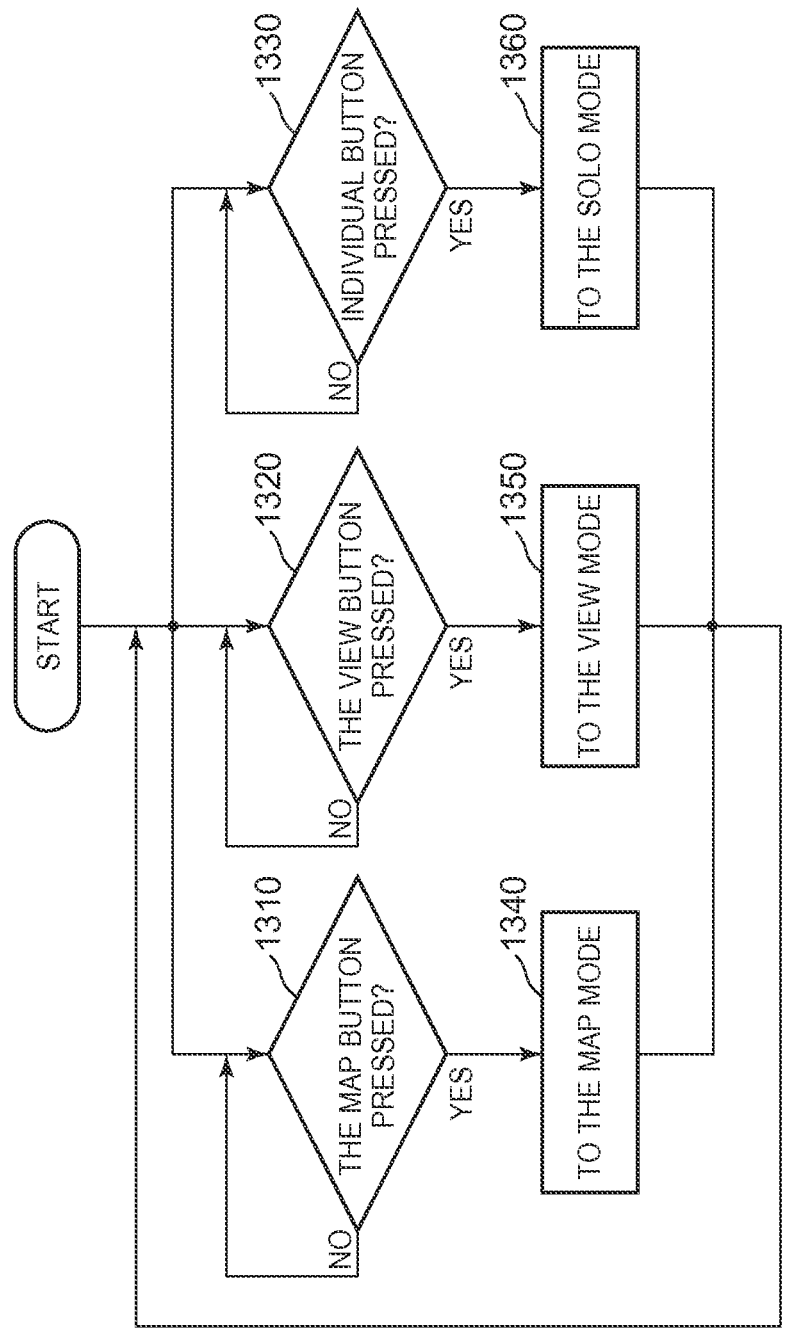
FIG. 13 is a flowchart for switching among the MAP mode, the VIEW mode, and the solo mode.

FIG. 13 is a flowchart for switching among the MAP mode, the VIEW mode, and the solo mode which are provided by the GUI 330. Specifically, FIG. 13 is a conceptual illustration of the event-driven type mode switching. When a mode button is selected, such as whether the map button is pressed in step 1310, the view button is pressed in step 1320, or the individual button is pressed in step 1330, the mode is switched to the designated mode, irrespective of the current mode, such that is the map button is pressed in step 1310 the mode switches to the map mode in step 1340, if the view button is pressed in step 1320 the mode switches to the view mode in step 1350, or if the individual button is pressed in step 1330 the mode switches to solo mode in step 1360. In the MAP mode, only the VIEW button is displayed on the GUI 330. When an area is designated, the MAP mode is switched to the VIEW mode. Further, when one of the sensors displayed as objects on the map is selected with a pointer or the like, the MAP mode is switched to the solo mode.

Figure 14:
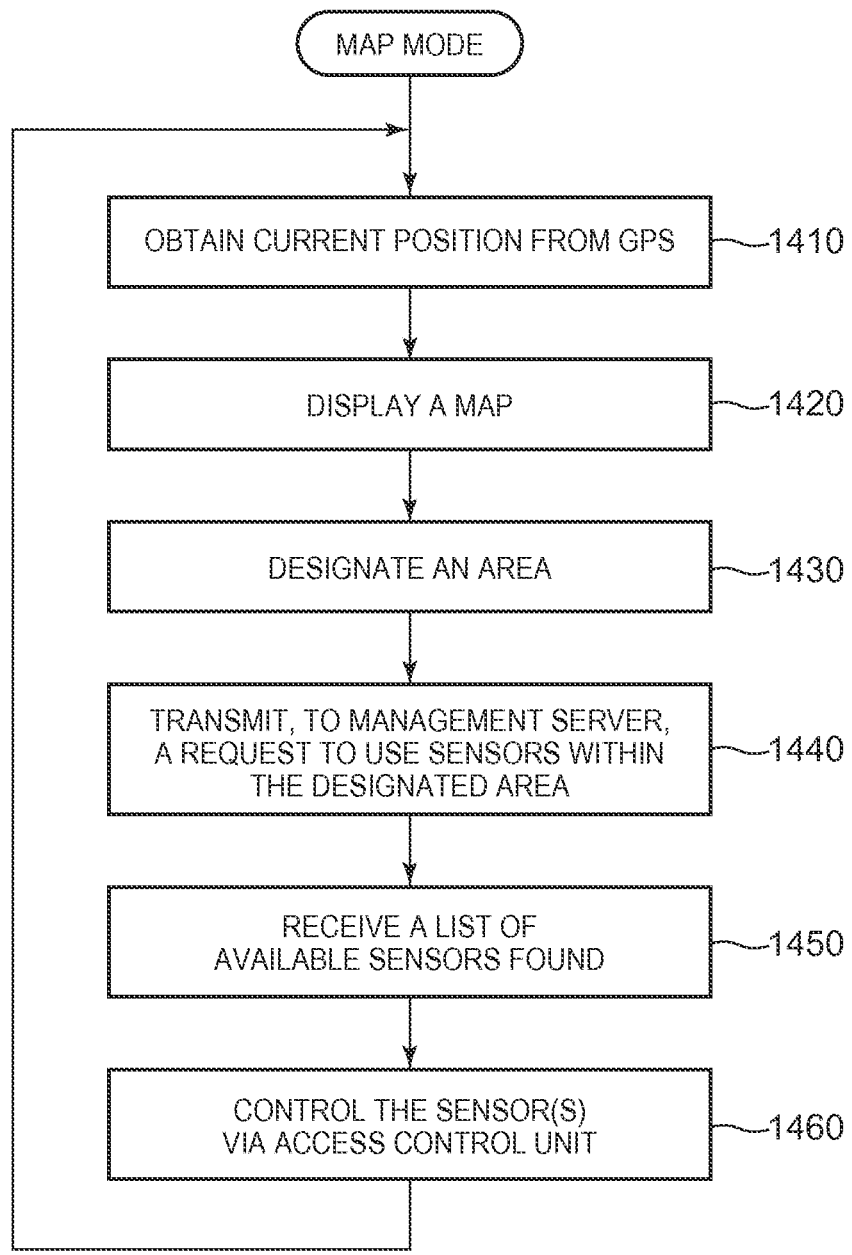
FIG. 14 is a flowchart illustrating the processing in the MAP mode.

FIG. 14 is a flowchart illustrating the processing in the MAP mode. The MAP mode corresponds to an initial screen of the GUI 330. First, in step 1410, the positional information of the sensor user terminal 121 is obtained from a GPS. In the case where the sensor user terminal 121 is in a fixed position as in a house, a building, or the like, it is unnecessary to confirm the GPS positional information.

Next, in step 1420, a map is displayed, with the sensor user terminal 121 positioned at the center of the screen. This ensures that, with the movement of the sensor user terminal 121, the map is drawn such that the sensor user terminal 121 is always at the center of the screen.

Next, in step 1430, an area is designated. In the second embodiment, a circular area is designated. First, a user is caused to select an area the user wishes to search, and to input a radius. Here, it may be configured to cause a user to designate a rectangular area. In such a case, the user is caused to designate the area by dragging the mouse from the starting point to the end point, like (X1, Y1)-(X2, Y2). This step 1430 may be skipped when an area is not designated, or when the area has already been designated because the mode was switched from another mode.

Next, in step 1440, a request for use of the sensors located inside the designated area is issued to the management server 110.

Next, in step 1450, a list of the available sensors is received from the access management unit 116. Preferably, a UI for excluding from the list any sensor that is not to be used or not necessary may be displayed. The sensor list is preferably configured to include information of the sensors which cannot be controlled but are located within, an expanded range (for example, twice the size) of the originally designated range. By doing so, any new sensor that may become controllable when the area is shifted can be recognized, and pre-authentication becomes possible. That is, device authentication may be completed in advance between the user terminal 121 and the sensor that may become controllable, for example by issuing authentication tokens or certificates. This ensures a real-time, seamless connection between the user terminal 121 and the sensors even in the case where the user terminal 121 moves at high speed and the sensor use conditions are frequently changed.

For example, in the case where the user terminal 121 has been installed in the police car that is pursuing the fleeing vehicle in FIG. 8, the above-described pre-authentication makes it possible to immediately search for, authenticate, and control any sensor that becomes available as the sensor selecting area 495 is gradually shifted to the area 810. On the other hand, the sensor that has become out of the range is dynamically disconnected. The location of each sensor included in the sensor list is preferably displayed as an object on the screen, in a reduced and deformed shape corresponding to the sensor type (for example, vehicle shape in the case of vehicle-mounted camera, camera shape in the case of fixed camera).

Next, in step 1460, information is obtained from the sensor(s) that has/have become available, and the sensor(s) is/are controlled via the access control unit 140 as necessary.

Figure 15:
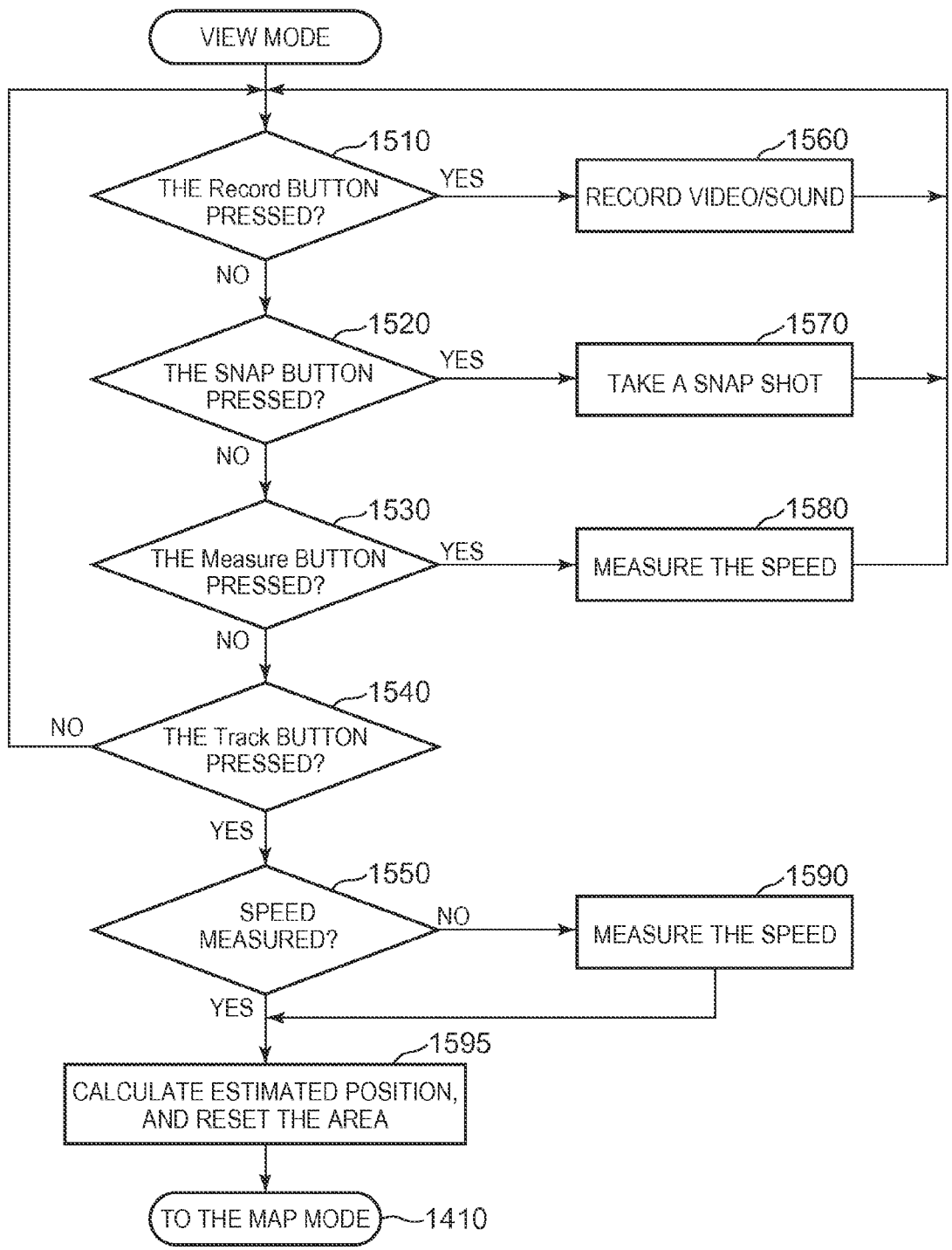
FIG. 15 is a flowchart illustrating the processing in the VIEW mode.

FIG. 15 is a flowchart illustrating the processing in the VIEW mode. In the VIEW mode, pieces of information on a plurality of sensors are simultaneously displayed and viewed on the respective windows. In step 1510, it is determined whether the Record button has been pressed. If so, video and sound are recorded, in step 1560. In step 1520, it is determined whether the SNAP button has been pressed. If so, a snap shot (a still image) is recorded and displayed in step 1570.

In step 1530, it is determined whether the Measure button has been pressed. If so, a physical parameter of the object is measured in step 1580. In the example of the second embodiment, the speed is measured. In step 1540, it is determined whether the Track button has been pressed. If so, it is checked in step 1550 whether the speed has already been measured. If the speed, has not been measured yet, the speed is first measured in step 1590. In step 1595, the current position is calculated using the speed, and an area having the calculated position at its center is designated. The mode is then switched to the MAP mode at step 1410.

It is noted that the speed may be measured in the following manner. For obtaining the vehicle speed, a pointer may be clicked on an object vehicle, moved, and clicked on the object again in a window, and the vehicle speed may be calculated from the time between the clicks, the travel distance, and the traveling direction. The vehicle speed may also be measured by a speed measuring sensor. The speed of an object may be obtained by selecting the object to lock it on. With the lock-on function, the position of the object is calculated by searching for an object having the same shape in a plurality of windows.

More specifically, the object selected in one window is subjected to shape analysis, and an object having the same shape is automatically selected in another window. This enables two-dimensional calculation of the current position of the object. While at least two windows of view are necessary for this calculation, a higher accuracy is expected when three or more objects are detected. The object is then tracked in the MAP mode, by setting the position of the object thus obtained at the center of the designated area.

The lock-on function may use image analysis. The two-dimensional position of the object can be obtained by selecting and shape-analyzing an object in a window in the VIEW mode, and automatically selecting an object having the same shape in another window. An area is designated by setting the obtained position at its center, and the mode is switched to the MAP mode. Even if the mode is switched, the position of the object is dynamically re-calculated, because the sensor information is obtained in the background.

The vehicle tracking by the Track button is performed in the following manner. The current position of the vehicle is estimated from the traveling direction and the vehicle speed measured in advance, or the lock-on function is used to estimate the position. An area including the position is designated, and the mode is switched to the MAP mode. This enables both real-time tracking of the object and dynamic changing of the available sensors.

Figure 17:
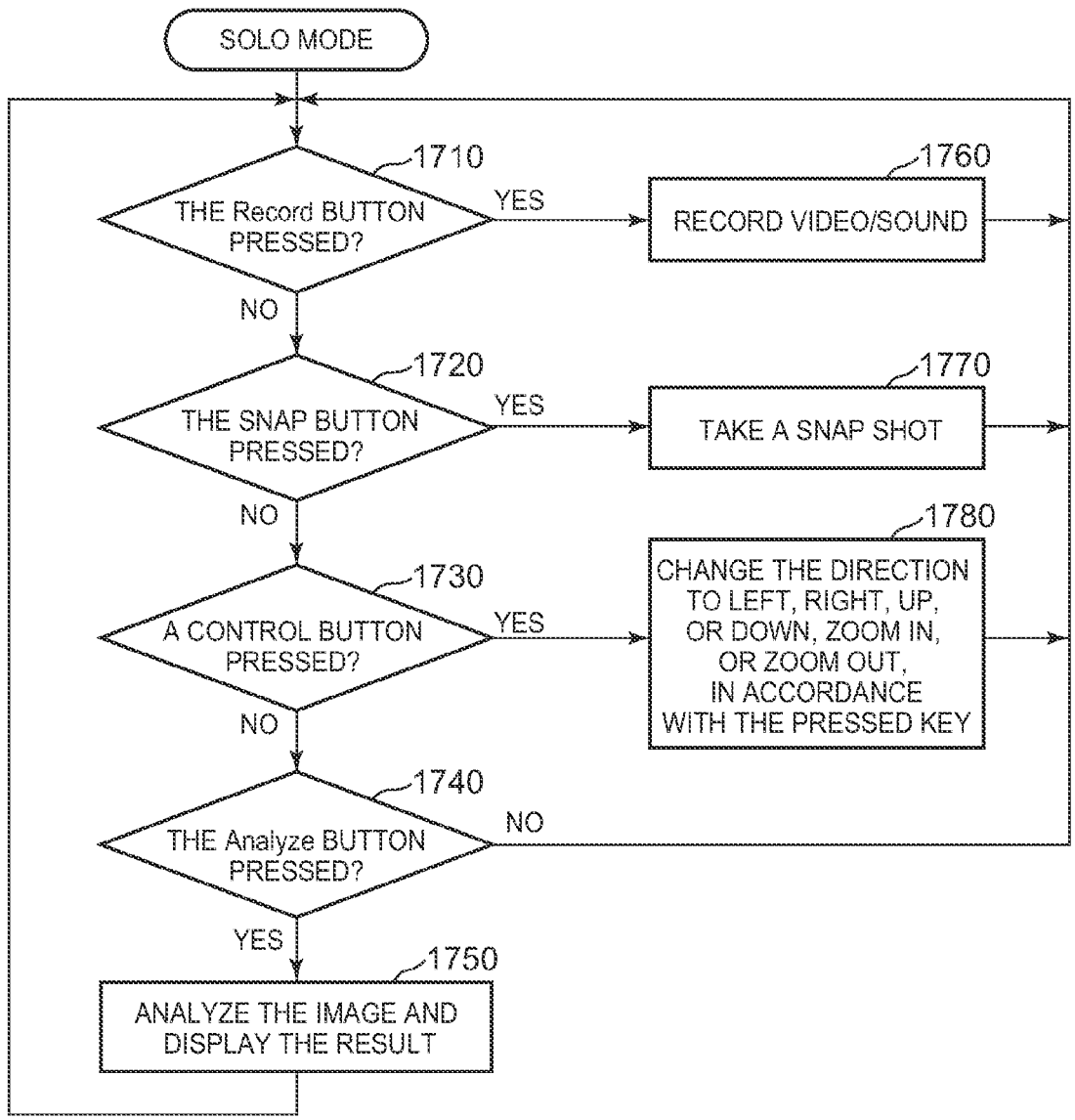
FIG. 17 is a flowchart illustrating the processing in the solo mode.

FIG. 17 is a flowchart illustrating the processing in the solo mode. In the solo mode, information on a single sensor is displayed. In step 1710, it is determined whether the Record button has been pressed. If so, video and sound are recorded in step 1760. In step 1720, it is determined whether the SNAP button has been pressed. If so, a snap shot (a still image) is recorded and displayed in step 1770.

In step 1730, it is determined whether a control button (or key) has been pressed. If so, the sensor control according to the pressed button (or key) is performed in step 1780, which may be changing the direction to the left, right, up, or down, or zooming in, or zooming out. In step 1740, it is determined whether the Analyze button has been pressed. If so, the image is analyzed in step 1750, and the result is displayed on the screen. The process then returns to step 1710.

Although the image analysis can be performed on a moving image, it is generally performed on a still image as a snap shot. A user may use a mouse or the like to designate an area in the still image the user wishes to analyze. The designated area is subjected to shape analysis, color analysis, personal recognition, and character recognition, and the analysis results are displayed at the bottom of the screen.

As described above, the configuration of the present invention enables dynamic sensor sharing control by a plurality of users. Necessary information can be obtained from necessary sensors in real time, making it possible to perform necessary control. Particularly, even when an object is moving, the object can be dynamically tracked by the sensors.

It is noted that the present invention is not restricted to the above-described examples; a variety of modifications and improvements are possible within the scope of the present invention.

The invention claimed is:

1. A sensor sharing control apparatus comprising:
   means for a use request processing unit to receive sensor use request information from a sensor user terminal;
   means for the use request processing unit to record a use request in a request policy and to notify a sensor searching unit that the request policy has been recorded;
   means for a use permission processing unit to receive sensor use permission information from a sensor provider terminal;
   means for the use permission processing unit to record a use permission in an authorization policy and to notify the sensor searching unit that the authorization policy has been recorded;
   means for the sensor searching unit to search for any authorization policy that matches the request policy in response to reception of the notification that the request policy or the authorization policy has been recorded; and
   means for creating a list of sensors included in authorization policies matched with the request policy; and
   means for transmitting the list to the sensor user terminal recorded in the request policy;
   wherein the searching means is configured to perform the search again dynamically when the request policy or the authorization policy is changed;
   wherein the request policy includes:
   a sensor type indicating a type of sensor being requested;
   a control level indicating a degree of control being requested;
   a requested location of a sensor;
   a requested function of a sensor; and
   one or more user attributes indicating a category to which a user of the sensor user terminal belongs;
   wherein the one or more user attributes include gender, age, address, occupation, and place of work of the user.

2. The sensor sharing control apparatus according to claim 1, further comprising means for the use request processing unit to authenticate validity of the sensor user terminal in accordance with the sensor use request information;
   wherein the sensor use request information is recorded in the request policy when the authentication is successful.

3. The sensor sharing control apparatus according to claim 1, further comprising means for the use permission processing unit to authenticate validity of the sensor provider terminal in accordance with the sensor use permission information;
   Wherein the sensor use permission information is recorded in the authorization policy when the authentication is successful.

4. The sensor sharing control apparatus according to claim 1, further comprising means for a status management unit to manage statuses of respective sensors, to create a list of available sensors in response to a request from the sensor searching unit, and to transmit the list to the sensor searching unit.

5. The sensor sharing control apparatus according to claim 1, further comprising means for an access management unit to receive the list of sensors from the sensor searching unit, to create a token allowing the sensor user terminal to control a sensor in the list, and to transmit the token to the sensor user terminal.

6. The sensor sharing control apparatus according to claim 1, wherein the means for receiving the sensor use request information includes means for receiving positional information of the sensor user terminal at regular intervals and updating the request policy.

7. The sensor sharing control apparatus according to claim 4, further comprising means for the status management unit to obtain positional information of a sensor at regular intervals and update the authorization policy.

8. The sensor sharing control apparatus according to claim 1, wherein the sensor use request information includes a user terminal ID, a sensor type, a position, and a degree of secrecy.

9. The sensor sharing control apparatus according to claim 1, wherein the sensor use permission information includes a sensor type, an installation location, a sensor serial number, and a degree of secrecy.

10. The sensor sharing control apparatus according to claim 7, further comprising a terminal, the terminal comprising:
    means for receiving a list of controllable sensors from the sensor sharing control apparatus;
    means for displaying a map on a display device on the basis of positional information of the sensor user terminal and the sensor;
    means operable, in response to designation of a sensor searching range on the displayed map, to display the controllable sensors located within the range, in the form of objects, at the positions of the corresponding sensors;
    means operable, in response to selection of the object, to display information of the corresponding sensor; and
    means operable, in response to designation of a control of the sensor, to transmit a signal for controlling the sensor to the sensor sharing control apparatus.

11. The sensor sharing control apparatus according to claim 7, further comprising a sensor, the sensor comprising:
    means for storing a token, received from the sensor sharing control apparatus, for making a function included in the sensor controllable;
    means for receiving a token from a sensor user terminal; and means for enabling the function to be controlled from the sensor user terminal when the received token matches the stored token.

12. The sensor sharing control apparatus of claim 1, wherein the authorization policy includes a user restrictive attribute which indicates a category of authorized users based on gender, age, address, occupation, and place of work.

13. A method for communicating with a sensor sharing control apparatus including a use request processing unit that accepts a sensor use request, a use permission processing unit that accepts a sensor use permission, and a sensor searching unit that searches for any available sensor by performing matching between the sensor use request and the sensor use permission, the method comprising steps of:

receiving a list of controllable sensors from the sensor sharing control apparatus;

displaying a map on a display device based on positional information of a sensor user terminal and the sensors;

in response to designation of a sensor searching range on the displayed map, displaying the controllable sensors located within the range as objects at respective positions of the corresponding sensors;

in response to selection of the object, displaying information of the corresponding sensor; and in response to designation of a control of the sensor, transmitting a signal for controlling the sensor to the sensor sharing control apparatus;

wherein the sensor use request includes:

a sensor type indicating a type of sensor being requested;

a control level indicating a degree of control being requested;

a requested location of a sensor;

a requested function of a sensor; and one or more user attributes indicating a category to which a user of the sensor user terminal belongs;

wherein the one or more user attributes include gender, age, address, occupation, and place of work of the user.

14. The method according to claim 13, wherein the controllable sensors are dynamically updated when the sensor searching range is changed or moved, and the updated sensors are displayed in the form of objects.

15. The method according to claim 14, wherein a moving object is set at a center of the sensor searching range and a position of the moving object is acquired based on information from the sensors, and the sensor searching range is dynamically changed in accordance with movement of the moving object.

16. The method of claim 13, wherein the sensor use permission includes a user restrictive attribute which indicates a category of authorized users based on gender, age, address, occupation, and place of work.

17. A computer program product comprising a non-transitory computer readable storage medium having a computer readable program stored therein, wherein the computer readable program, when executed on a computer, causes the computer to perform a method comprising:

receiving a list of controllable sensors from a sensor sharing control apparatus;

displaying a map on a display device based on positional information of a sensor user terminal and the sensors;

in response to designation of a sensor searching range on the displayed map, displaying the controllable sensors located within the range as objects at respective positions of the corresponding sensors;

in response to selection of the object, displaying information of the corresponding sensor; and in response to designation of a control of the sensor, transmitting a signal for controlling the sensor to the sensor sharing control apparatus;

wherein receiving the list of controllable sensors from the sensor sharing control apparatus comprises receiving the list based on the sensor sharing control apparatus matching one or more sensor use permissions with a sensor use request from the sensor user terminal;

wherein the sensor use request includes:

a sensor type indicating a type of sensor being requested;

a control level indicating a degree of control being requested;

a requested location of a sensor;

a requested function of a sensor; and one or more user attributes indicating a category to which a user of the sensor user terminal belongs;

wherein the one or more user attributes include gender, age, address, occupation, and place of work of the user; and wherein the sensor use permission includes a user restrictive attribute which indicates a category of authorized users based on gender, age, address, occupation, and place of work.

* * * * *